United States Patent [19]

Franaszek et al.

[11] Patent Number: 4,525,724

[45] Date of Patent: Jun. 25, 1985

[54] MAGNETIC RECORDING HEAD ARRAY FOR LONGITUDINAL MAGNETIC PRINTING WITH STAGGERED HEAD ARRANGEMENT AND CLUSTERED WIRING

[75] Inventors: Peter A. Franaszek, Katonah; Edward J. Yarmchuk, Purdys, both of N.Y.

[73] Assignee: International Business Machines Corporation, Armonk, N.Y.

[21] Appl. No.: 394,016

[22] Filed: Jun. 30, 1982

[51] Int. Cl.³ .......................................... G01D 15/12
[52] U.S. Cl. ................................................. 346/74.5
[58] Field of Search ............................ 346/74.2, 74.5

[56] References Cited

U.S. PATENT DOCUMENTS

| | | | |
|---|---|---|---|
| 3,890,623 | 6/1975 | Schmid et al. | 346/74.5 |
| 4,072,957 | 2/1978 | Kokaji et al. | 346/74.5 |
| 4,097,871 | 6/1978 | Berkowitz et al. | 346/74.5 |
| 4,176,362 | 11/1979 | Nelson | 346/74.5 |
| 4,257,051 | 3/1981 | Lindsay et al. | 346/74.5 |
| 4,380,758 | 4/1983 | Palombo et al. | 346/74.5 |

Primary Examiner—Thomas H. Tarcza
Attorney, Agent, or Firm—Graham S. Jones, II

[57] ABSTRACT

A magnetic recording head array for printing onto a transfer magnetic recording medium which prints magnetic material onto a medium such as paper includes staggered arrays of magnetic print heads. The heads are in diagonally staggered parallel arrays tilted away from the vertical. Each array in a group of several arrays is also staggered in the vertical direction as well as the longitudinal direction. Preferably, the heads or other bistable elements are wired in clusters with the heads or other elements in the cluster being coupled to the same actuator wires in a half-select type or wiring arrangement. The difference in the wiring of the elements will reside in the sense of the signal as applied to the elements by means such as reversing the helical winding about a core or the like. In the manufacture of the array, the horizontal wiring lines for actuating arrays are in the form of straight lines.

13 Claims, 22 Drawing Figures

128 GROUPS OF RECORDING GAPS
32 GAPS PER GROUP

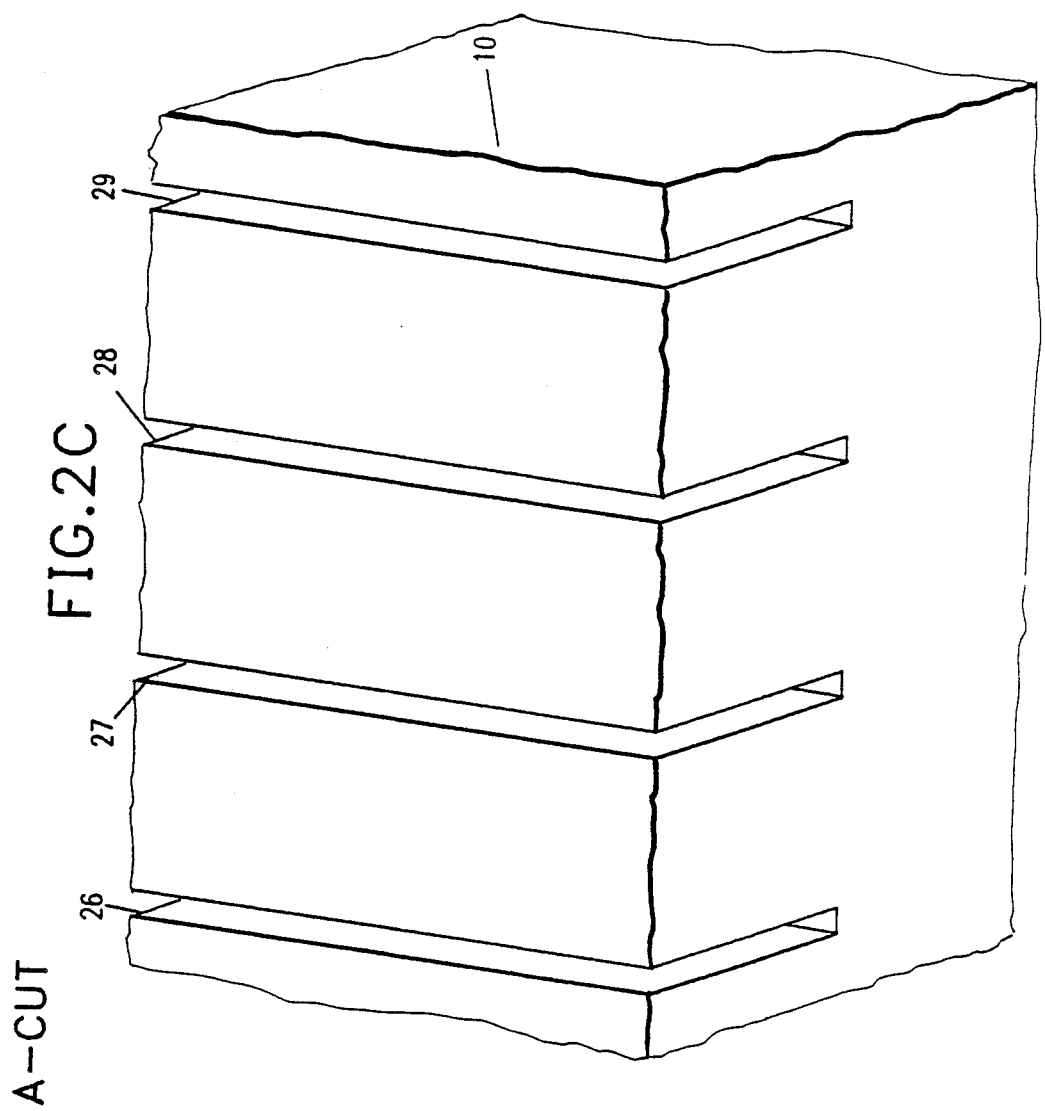
FIG.2C A-CUT

A-CUT

B-CUT

C-Cut

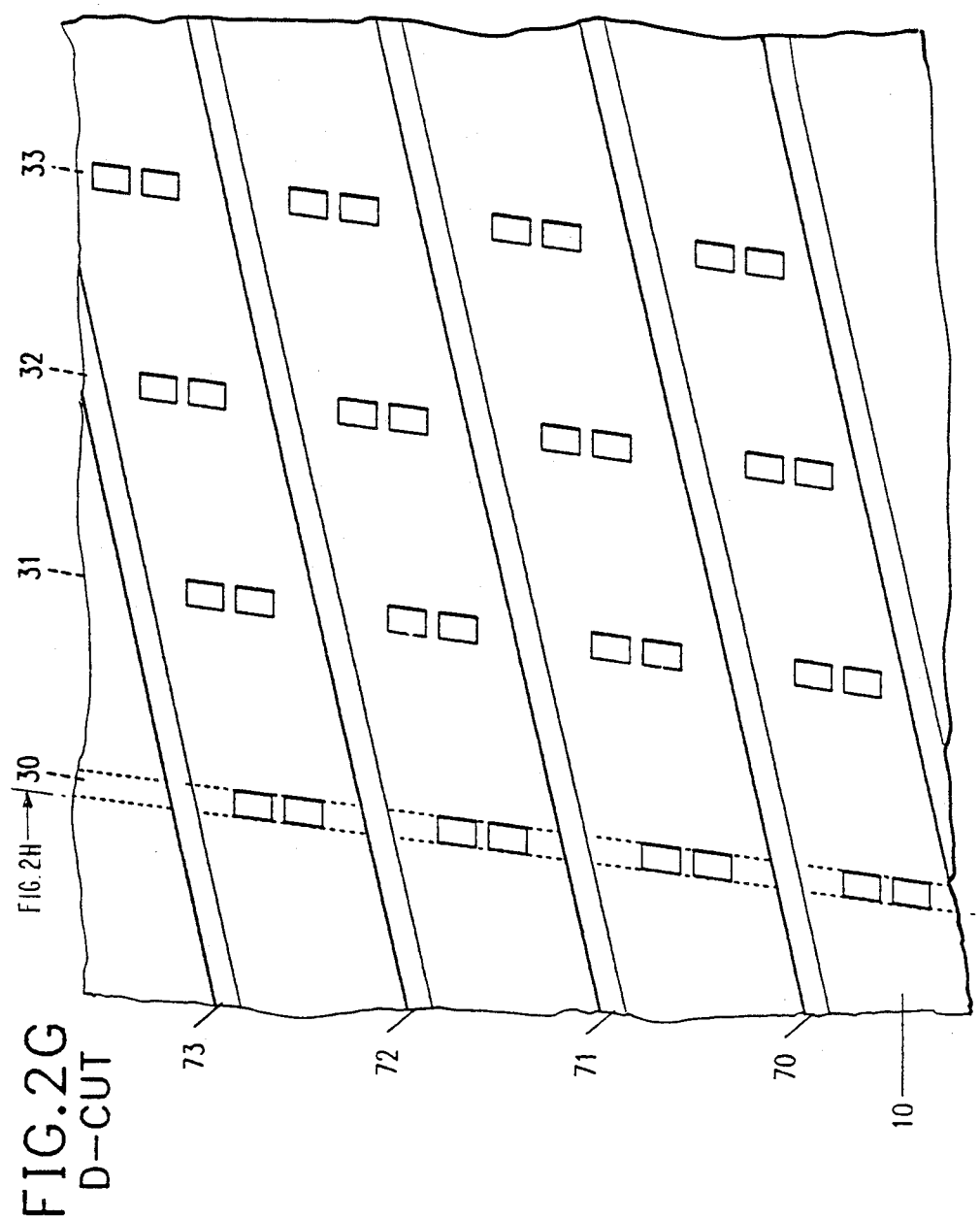

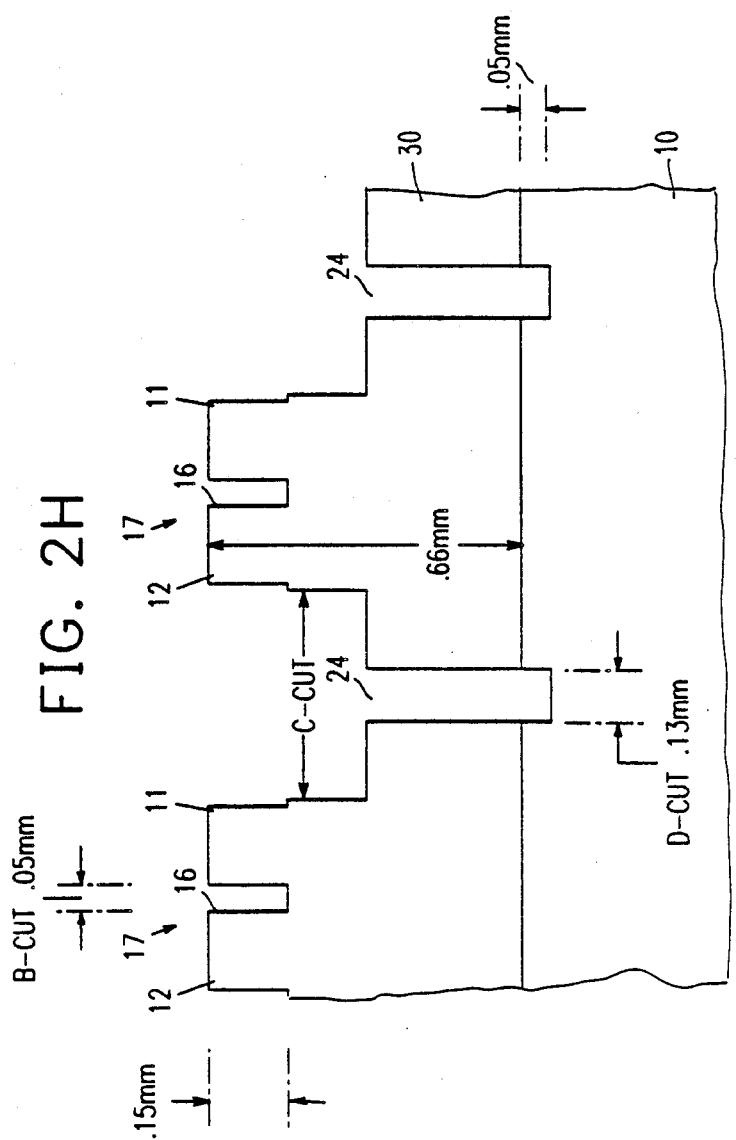

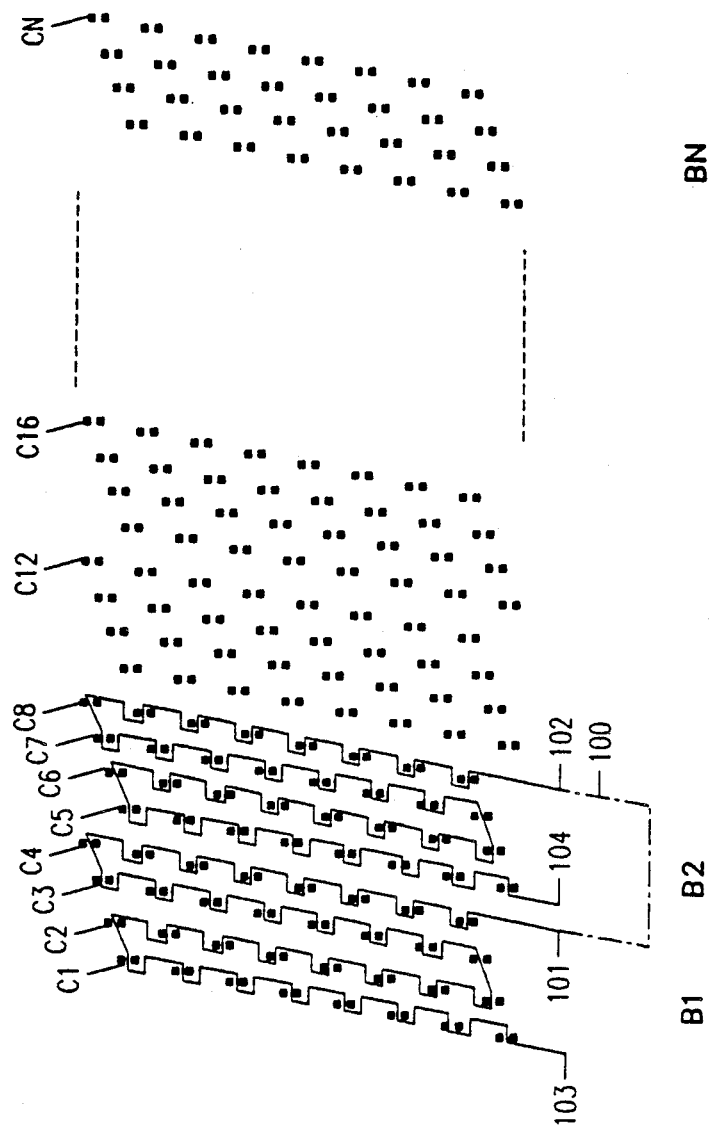

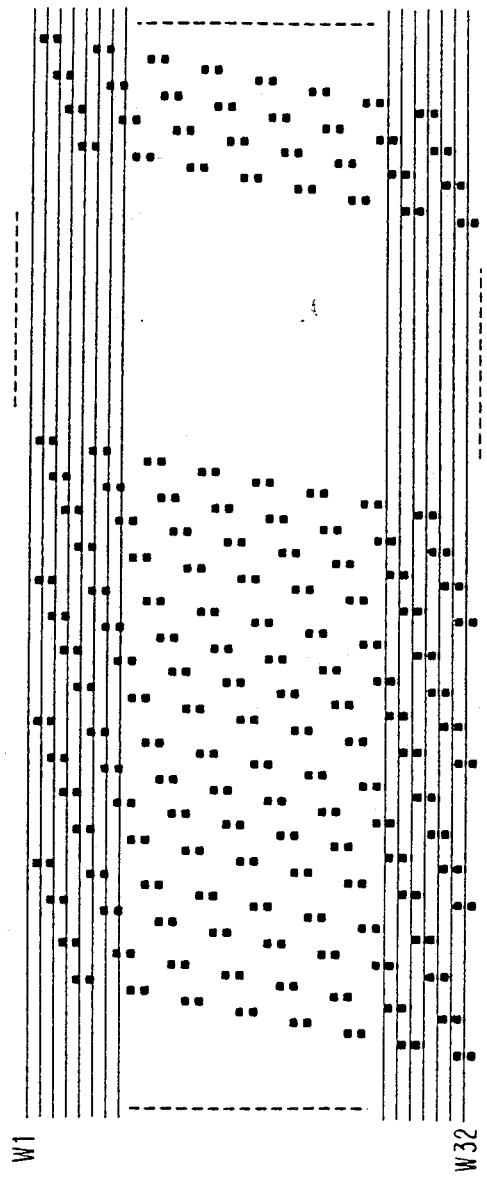

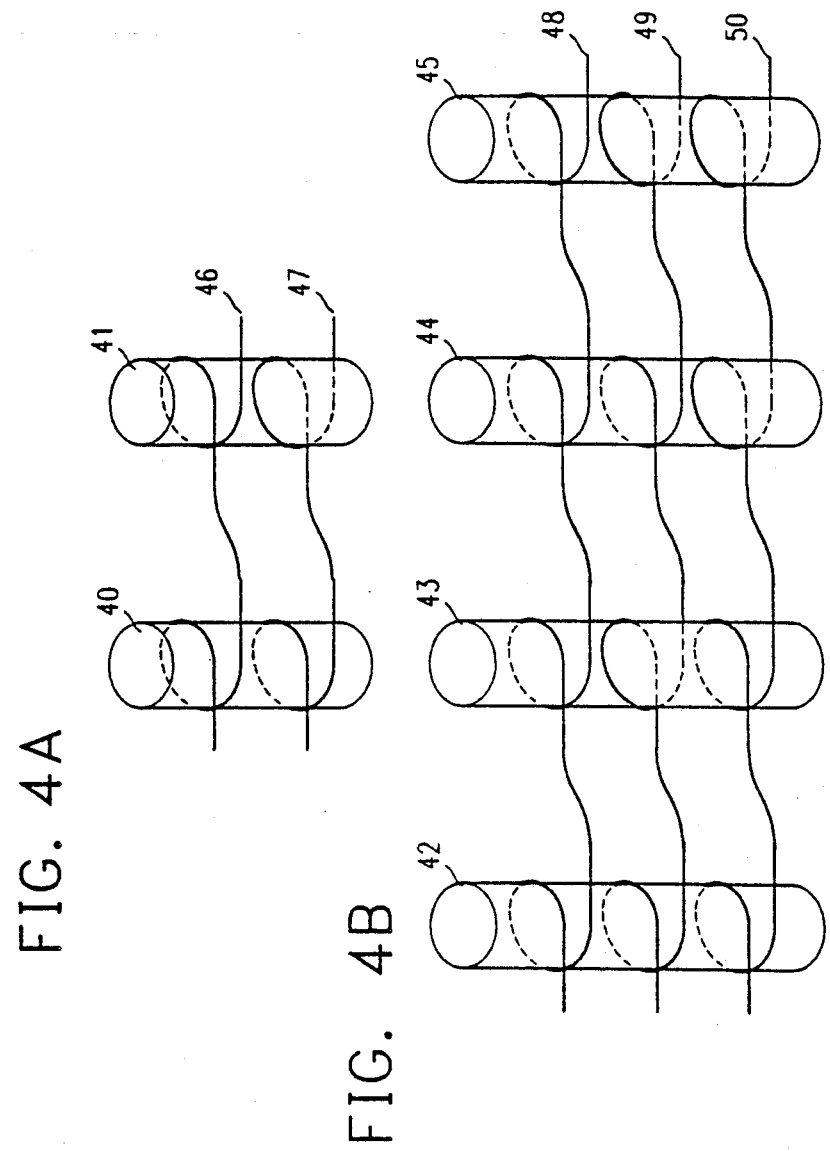

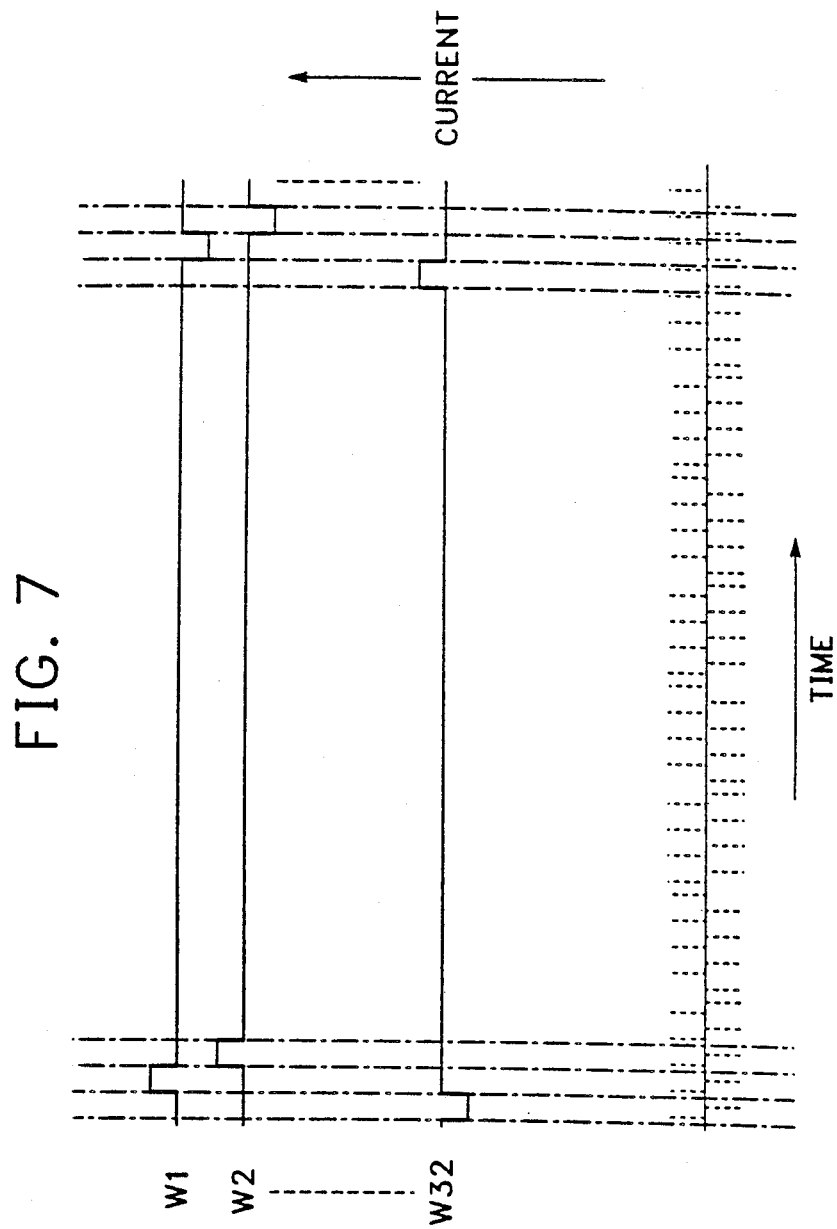

MAGNETIC RECORDING HEAD ARRAY FOR LONGITUDINAL MAGNETIC PRINTING WITH STAGGERED HEAD ARRANGEMENT AND CLUSTERED WIRING

BACKGROUND OF THE INVENTION

1. Field of the Invention

This invention relates to magnetic image recording systems and more particularly to transfer printing systems for printing latent images magnetically onto a transfer medium moving past a magnetic print head array which prints onto a medium for receiving a permanent printed image.

In another aspect, this invention relates to coincident current wiring arrays for operating a plurality of elements having a binary operating characteristic by application of binary, ternary or higher order signals to a set of bit lines and a set of word lines.

2. Background Art

Three types of recording modes are possible for magnetic printing. Vertical recording, in which the magnetization is perpendicular to the plane of the medium has been pursued as in "Magnetic Printer Using Perpendicular Recording", J. J. P. Eltgen and J. G. Magnenet, IEEE Trans. on Mag., MAG-16, 961 (1980). However the method requires the use of special media and involves recording heads which are difficult to fabricate for high resolution printing applications. An alternative is transverse recording, in which the magnetization lies within the plane of the medium but transverse to its direction of motion, as described in "Transverse Recording Head for Magnetic Printing", A. E. Berkowitz, J. A. Lahut, and J. M. Wang, U.S. Pat. No. 4,097,871. Although this type of recording can be achieved with a relatively simple head array structure, the implementations result in a pattern of recorded spots with unrecorded spaces between them. Thus, the quality of the print is not as high as it would be if the entire area of the medium could be magnetized in a pattern of stripes of alternating polarities. With longitudinal recording, in which the medium is magnetized in the plane but along the direction of motion, any type of pattern can be generated.

U.S. Pat. No. 3,890,623 of Schmid for "Magnetic Document Encoder Having Multiple Staggered Styli" describes an arrangement in which "styli are staggered along a row oblique to the transport path of the medium such that each stylus is a different distance from the reference line. Portions of the medium lying along a line normal to the transport path will thus pass adjacent each stylus at a different time. Electronic delay circuits are provided to accordingly selectively delay the application of the energization pulses to given styli." Later it is stated "The physical size of the styli and the associated electromagnetic coils surrounding each stylus needed to generate an intense localized magnetic field to magnetize such permanent magnet materials can be accomodated in a structure in which the styli are diagonally positioned relative to the transport path. The styli within the second group . . . are, therefore staggered along the transport path to avoid magnetic interference and space limitations. Such positioning of the styli together with selective energization of the styli in time spaced relationship to the movement of the medium along the transport path provides for closely spaced magnetized area with the distance perpendicular to the transport path . . . between the first and last styli . . . respectively, permitting the alphameric characters to be formed having the height of a standard alphameric font, i.e. 0.100 inches (2.54 mm)." The stylus assembly is employed to encode a medium such as a source document carrying magnetic particles, which document is carried under the styli by means of an endless belt. The magnetized medium "is useful as a master source document in which the magnetized locations represent encoded information, which information is readily magnetically transferred to a transfer sheet." No mention of magnetic printers is made.

U.S. Pat. No. 4,072,957 of Kokaji et al for "Nonimpact Printing System with Magnetic Recording Apparatus and Method" describes recording a magnetic latent image with an array of scanning recording heads on a magnetic recording medium. The medium is a drum covered with a thin magnetic film. Magnetic toner is applied to the drum by forming the latent image on the drum from the operation of the recording heads. In FIG. 8 a staggered array of heads in a v formation is shown. The heads are operated by a delay circuit which compensates for the space between the heads so that the magnetic record pattern on the drum is formed in a line. Reference is made to such a circuit with "a method for recording characters, letter and marks on the drum using multiple heads" in Japanese Pat. No. 50-23567.

U.S. Pat. No. 4,176,362 of Nelson for "High Density Magnetic Image Recording Head" shows an array of magnetic recording heads aligned in a straight line to record data on magnetic tape which transfers the data onto a magnetic drum in a printer using magnetic toner. Then terminals to the heads are shown in a staggered array" so that the entire arrangement of elements including the common interconnect regions and the staggered and relatively wide terminals can be accomodated in a head of moderate size." The heads are aligned and are not staggered. There is a wiring scheme, which does not relate to the instant wiring system particularly.

U.S. Pat. No. 4,257,051 of Lindsay et al for "Apparatus and Method for Driving a Magnetic Print Head" describes a coincident current winding arrangement for driving magnetic print heads in a special sequence to minimize spurious printing caused by undesirable concentrations of magnetic flux. For each head both a word winding and a digit winding has to be energized to actuate it, in a coincident current actuation scheme modified by breaking the digit windings into groupings of nonadjacent heads so that each grouping can be energized separately and successively to minimize spurious magnetic flux distribuions.

In accordance with this invention, a class of recording head structures is provided which is suitable for high resolution magnetic printing using longitudinal recording. Also a novel method of coincident current wiring is introduced which leads to a reduction in the number of control lines required for addressing arrays of recording heads and which is applicable to a wide class of transducer or memory element arrays. The application of this method to the proposed type of longitudinal recording array results in extremely simple and compact wiring patterns.

An array of magnetic recording heads is provided for producing spots in a single row, but they are staggered along the y axis (relative to the x axis along the horizontal row) in order to reduce the magnetic interaction between adjacent heads. The activation times of the heads need to be staggered in order to cause a straight line to be printed. This is used in a magnetic transfer printer. The magnetically printed image is later transferred from a magnetic transfer medium on which the print is made to a paper on which toner is fixed, as in magnetic transfer printing. Preferably, the staggering of the heads is provided with parallel staggered arrays of heads forming a subset of heads. Preferably the subset has an additional staggering of the first head in each row of the staggered subset in the y direction. The double staggering of the heads in the parallel arrays in a subset of heads is provided for the purpose of optimizing separation of the heads and to minimize the head alignment problem when fabricating the heads with the horizontal alignment of the wiring transverse with respect to the arrays being straight and permitting a substantial lateral shift in position of heads along the wiring.

The magnetic elements are activated by a modified half select technique wherein there are clusters of elements. These clusters comprise a multiplicity of elements sharing identical wires. The wires are would about each of the elements in the cluster but some of them are wound with one polarity and some with the other polarity so that each element has a unique set of polarity characteristics so any one of the elements in a cluster can be activated by currents of the proper polarity in the wires of the proper polarity in the wires common to that cluster.

Thus an array of N wires and a cluster of K transducers is provided, where N and K are integers greater than one, each of the transducers having N wires as inputs, each of the transducers being responsive by producing an output upon reception from the wires of a unique binary combination of values on the N wires, with all of the remainder of the K transducers not being responsive to the unique binary combination.

In accordance with this invention, an arrangement of magnetic recording heads for recording a magnetic line of data, the heads are in a staggered arrangement in order to provide greater separation between heads for a given data density along the line of data. The arrangement is separated into a plurality of parallel segments at a predetermined periodicity to form a group of heads. Preferably, a plurality of parallel arrays extends at an angle to the line of data to be printed; and the arrays are staggered relative to each other. Further for a group of heads, a single energizing line comprising a bit line is coupled to each of the heads, and a plurality of word lines are connected to subgroups of heads in the group. A pair of heads is connected to a set of word and bit lines with the sense of the magnetic fields of the set of word and bit lines being relatively reversed through the pair of heads whereby operation of the bit line and the word line will depend upon the sense of current polarity in the lines. Preferably, the heads in such a group of heads are arranged with parallel arrays of heads contained within a shape in the form of a parallelogram tilted within a 90° sector with respect to the line of data to be printed with one array extending at a small acute angle to a perpendicular with respect to the line with the adjacent heads in the array printing adjacent points on the line and with the parallel array to the one line having the lowest head in the array staggered along a perpendicular line, with respect to the lowest head in the first array in the group. Preferably, the lowest head in each array and the highest head in each array define the upper and lower ends of the parallelogram extending at a small acute angle above the printing line. It is desirable that the word lines are parallel straight lines extending directly through the gaps in the heads to which the word lines are coupled with a plurality of groups of arrays of heads being coupled to each of the word lines in like manner.

In an arrangement of a plurality of magnetic heads formed in a staggered array, the improvement comprising the heads being formed in a plurality of groups of parallel arrays with the gaps in the heads in adjacent arrays being aligned in a periodically staggered arrangement with a word line being coupled to heads along a transverse line on a periodically selective basis and all of the heads in a group being coupled to a single bit line with the sense of current for a given head being reversed in the bit line for the other head coupled to the same word line.

A structure carrying a plurality of magnetic recording heads in a staggered array arrangement wherein the array is formed of a plurality of parallel arrays of heads staggered along a given line of the arrays with the parallel arrays being staggered relative to the line being recorded wherein the heads in a given array are formed in a strip of magnetic material deposited into a diagonal parallel slot in a substrate with a plurality of strips inserted into a plurality of slots with transverse diagonal cuts through the strips cut in parallel across the strip to form slots for magnetic recording gaps. The said are cut by means of a horizontal cut, a plurality of cuts between the heads being cut at a small acute angle extending down into the substrate thereby removing superfluous magnetic strip material from the strips to define separate magnetic heads from the strips.

In an arrangement of a plurality of bistable devices having at least two actuation lines comprising bit and word lines for actuating selected ones of the device, the improvement comprising grouping the devices into clusters and actuating the devices with a common set of lines by reversing the sense of actuation current in each of the lines connected to the devices in the cluster.

An array of magnetic heads is arranged in a staggered set of arrays adapted to produce data which is transferred by a scanning surface interacting with the heads to produce a straight line of data, with parallel staggered arrays of heads forming a subset of heads, with staggering of the columns of arrays along the y axis in order to maximize the separation distance between the magnetic heads to minimize the interaction between the heads.

In an array of N wires and a cluster of K transducers, where N and K are integers greater than one, each of the transducers having N wires as inputs, each of the transducers being responsive by producing an output upon reception from the wires of a unique binary combination of values on the N wires, with all of the remainder of the transducers not being responsive to the unique binary combination.

A set of magnetic elements activated by a modified half-select technique wherein the elements are divided into clusters.

The clusters comprise a plurality of elements sharing identical wires, with the wires shared by the elements being applied to the elements with differing polarity permutations for each element, whereby each element is supplied a unique set of input signals so that any one of the plurality of elements in a cluster can be activated by signals of the proper polarity in the proper combination while all of the remaining elements in the cluster will not be activated for the proper combination for the one of the plurality of elements.

BRIEF DESCRIPTION OF THE DRAWINGS

FIG. 2C shows a perspective view of a substrate grooved by machining slots at an angle adapted to receive strips of magnetic material for forming the magnetic print heads of FIGS. 2A and 2B.

FIG. 2G is a plan view of the result of FIG. 2F which shows the narrow and deep D-cuts between the heads which are deeper than the depth to which the magnetic strips extend whereby the magnetic heads are separated from one another. The C-cuts of FIG. 2F are omitted for simplicity of explanation, as are the remnants of the B-cuts which are crossed by the C and D cuts.

FIG. 2H is an elevational, sectional outline view of the structure produced by the fabrication steps of FIGS. 2C-2G with all of the B, C, and D cuts indicated.

FIG. 3A is a bit line wiring diagram for the head array of FIG. 2A.

FIG. 3B is a word line wiring diagram for the head array of FIG. 2A applicable to the bit line wiring diagram if FIG. 3A and FIG. 6 which will cooperate with those bit line arrangements to operate in accordance with this invention.

FIG. 4A is a schematic diagram of two-dimensional clustering of heads or other binary devices with reversal of wiring yielding differing results in adjacent heads with the same wiring lines.

FIG. 4B is a schematic diagram of a three-dimensional wiring arrangement for a clustering of four heads with three wires. Each of the heads is wrapped by each wire being unique so that the heads can be uniquely activated.

FIG. 7 is a showing of the current waveforms for the bit and bit lines of FIG. 3A and FIG. 6 and the word lines of FIG. 3B.

DESCRIPTION OF THE PREFERRED EMBODIMENT

Figures 1A, 1B:
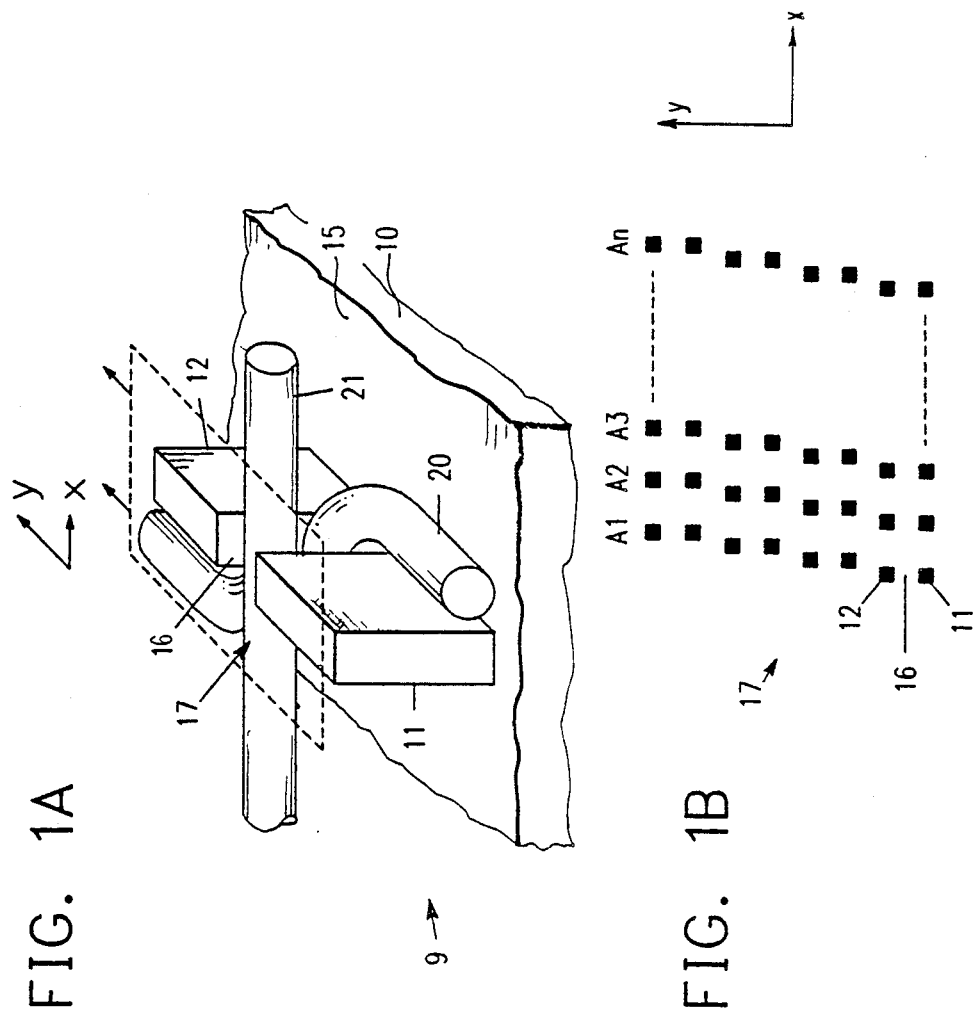
FIG. 1A is a perspective view of a single magnetic recording head of a magnetic printer in accordance with this invention.
FIG. 1B is a sketch of a plurality of columns of arrays of staggered magnetic recording heads of the variety shown in FIG. 1A.

A fragment of a recording head structure 9 adapted for producing longitudinally recorded spots in a magnetic printer is shown in FIG. 1. A pair of magnetic posts 11 and 12 of a bifurcated or horseshoe magnet embedded in a substrate 10 of a dielectric material protrude above the upper surface 15 of substrate 10. Except for the magnetic structure of the horseshoe magnet, the substrate can be magnetically and electrically inactive. Above the posts 11 and 12 parallel to the upper surface 15 of the substrate 10, is a moving magnetic printing (recording) medium 14 which is moving in the direction shown by the double arrows from left to right. A pulse of electrical current passing through the gap 16 in wires such as wires 20 and 21 between the posts 11 and 12 produces a magnetic field at the magnetic printing medium 14 which results in a roughly square spot of remanent magnetization. An array of such post pairs 17 arranged so as to record adjacent spots along the x direction can produce a magnetic latent image of a document. By standard means, described in "A Review of Magnetic Printing", W. H. Meiklejohn, Proc. AIP Conf. on Mag. and Mag. Mat. (C. D. Graham and J. J. Rhyne, eds.) 10, 1102 (1972) this image can be developed with magnetic toner particles and transferred to paper. The simplest arrangement of post pairs 17 is a linear array in which the recording or printing head structures are placed side-by-side along the width of the page (x direction). However, there are several factors which make such an arrangement unsatisfactory. First, the post pairs must be placed extremely close together in order to provide full recording coverage with a high density of printing data per line. This leads to a low magnetic reluctance path between adjacent pairs of posts 17 thereby distorting the field profile and lowering the value of electrical current passing through wires 20 and 21 and lowering the effective current at which the post pairs 17 of magnetic material are saturated. This is undesirable because field distortion increases spot size and saturation can prevent recording of spots entirely.

In addition, the passage of current carrying conductors 20, 21 between the post pairs 17 can produce unwanted transverse recording of the medium if the post pairs 17 are very close together. Thus, the problem to be addressed in longitudinal recording is that of finding an arrangement in which the recording head structures are magnetically isolated from each other to the degree which is practical.

In accordance with this invention, the heads 17 which write adjacent spots along the x direction on medium 14 are physically displaced along the y direction relative to the medium 14 on the substrate carrying the post pairs 17. A schematic of an array of heads 17 arranged in accordance with the simplest interpretation of this concept is illustrated in FIG. 1B. It can be seen that the recording heads 17 are physically isolated from each other and hence they are magnetically isolated from each other to a greater degree than if they were aligned next to each other. Many variations of this design approach can be employed. For example, the y displacement between adjacent heads 17 and the repetition period of the array (in the pattern of FIG. 1B the pattern repeats every four heads with four repetitions shown with columns A1, A2, A3 and A4 each containing four heads 17) are parameters which can be adjusted to accomodate particular design concerns one might have. In this embodiment the medium upon which data is written is moving in the y direction so each of the heads will be able to write a spot on a line as the line passes by the head in question.

Note that spreading out of the array in the y direction tends to isolate the recording heads 17 magnetically, but it also leads to a mechanical alignment problem of increasing the accuracy of alignment of the array with respect to the motion of the medium. Thus, one design concern is that the y extent of the array should be kept as small as possible or practical within the context of the system employed. One must also consider the layout of the current carrying conductors 20, 21 which are used to activate the recording heads 17 selectively. To a large extent, the simplicity of the wiring layout as well as its electrical characteristics are affected by the pattern of the recording head array. Thus, the relationship between the head array and the wiring constitutes another important design consideration.

The array of magnetic recording heads shown in FIGS. 2A-2G is an example of a special class of staggering patterns which combines magnetic isolation of elements and simple patterns of wiring with a minimum extension of the array along the y direction.

Figure 2A:
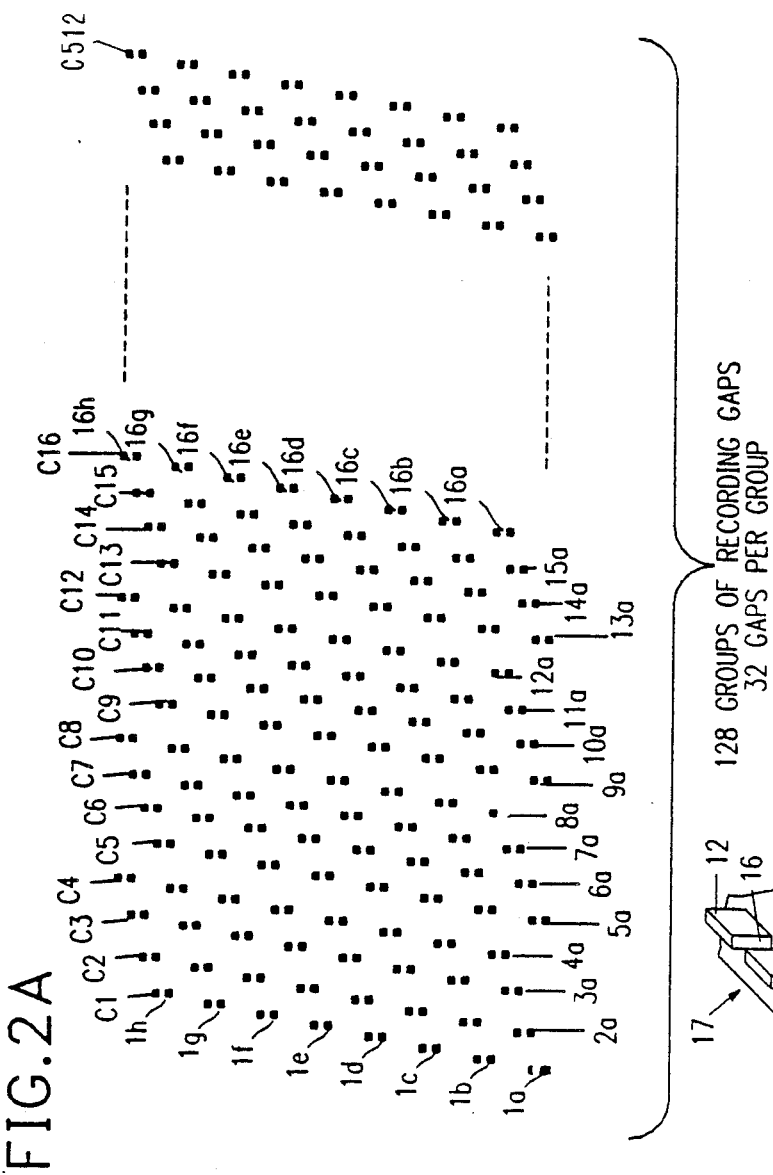
FIG. 2A shows an array of heads in accordance with FIG. 1A which are formed in parallel columns of staggered arrays. The columns are staggered also. There are a plurality of groups of 32 heads in each group.
Figure 2B:
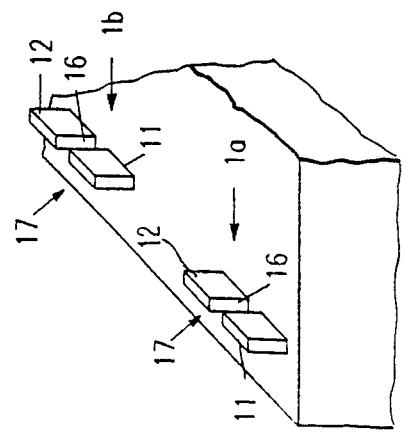
FIG. 2B shows a perspective view of a pair of heads from FIG. 2A, in accordance with FIG. 1A.

Referring to FIGS. 2A and 2B, the staggering of the heads 17 on substrate 11 is such that a series of columns C1-C16 to C512 is formed. Column 1 consists of eight heads 1a, 1b,.... 1h. Column 2 consists of heads 2a-2h, etc. up to 16a-16h for column C16, etc. It is to be noted that the columns C1-C16 are staggered in the y direction themselves as C1-C4, etc. while the heads are staggered in the x and y directions within a column also 1a, 2a, 3a, 4a, etc. Column C2 is shifted relative to column C1 in the y direction by one quarter of the distance between heads within each column. In like manner, column C3 is shifted relative to column C2 by the same amount. This repeats again for column C4 so that the head 4a is just slightly lower than head 1b in the y direction. However, column C5 is on the same level as column C1 and as column C9 and C13, so that heads, 1a, 5a, 9a, and 13a, are all on the same line in the y direction. Similarly heads 2a, 6a, 10a, and 14a in columns C2, C6, C10 and C14 are on the same line relative to the y axis. Columns C3, C7, C11 and C15 are on the next level and C4, C8, C12 and C16 are shifted to the highest level of the set of columns in each array. Note that five sets of arrays of 32 heads in each array is shown with a space left indicating that there may be more sets of heads, as many as required for full width printing.

The periodicity of the staggering of the columns C1-C4 and C5-C8, etc. can be seen to be four while that of the heads into the columns is eight, with head 1h being the eighth head relative to head 1a. The overall periodicity of the head array C1-C4, and C5-C8, etc. in the embodiment of FIG. 2A is therefore in sets of 32 heads. The special property of the array is that each set or group (e.g. C1-C4) forms an array of 32 heads which are equally spaced along the y axis. The general prescription for an array possessing this special property is that the displacement along the y axis of heads within a column is equal to the periodicity of the column staggering multiplied by the displacement along the y axis of the columns comprising a group or set. For example, one can conceive of an arrangement in which there are columns of N heads per column which are arranged in groups M columns per group or set, where N and M are positive integers.

FIG. 2C shows the substrate 10 of dielectric material prior to the introduction of the magnetic material from which the heads are formed. Substrate 10 is shown with an array of parallel cuts 26-29 referred to as the A cuts which form deep grooves on the order of 0.51 mm deep and about 0.1 mm wide. These grooves 26-29 are provided to carry magnetic strips from which the bifurcated heads 17 are to be formed.

Figure 2D:
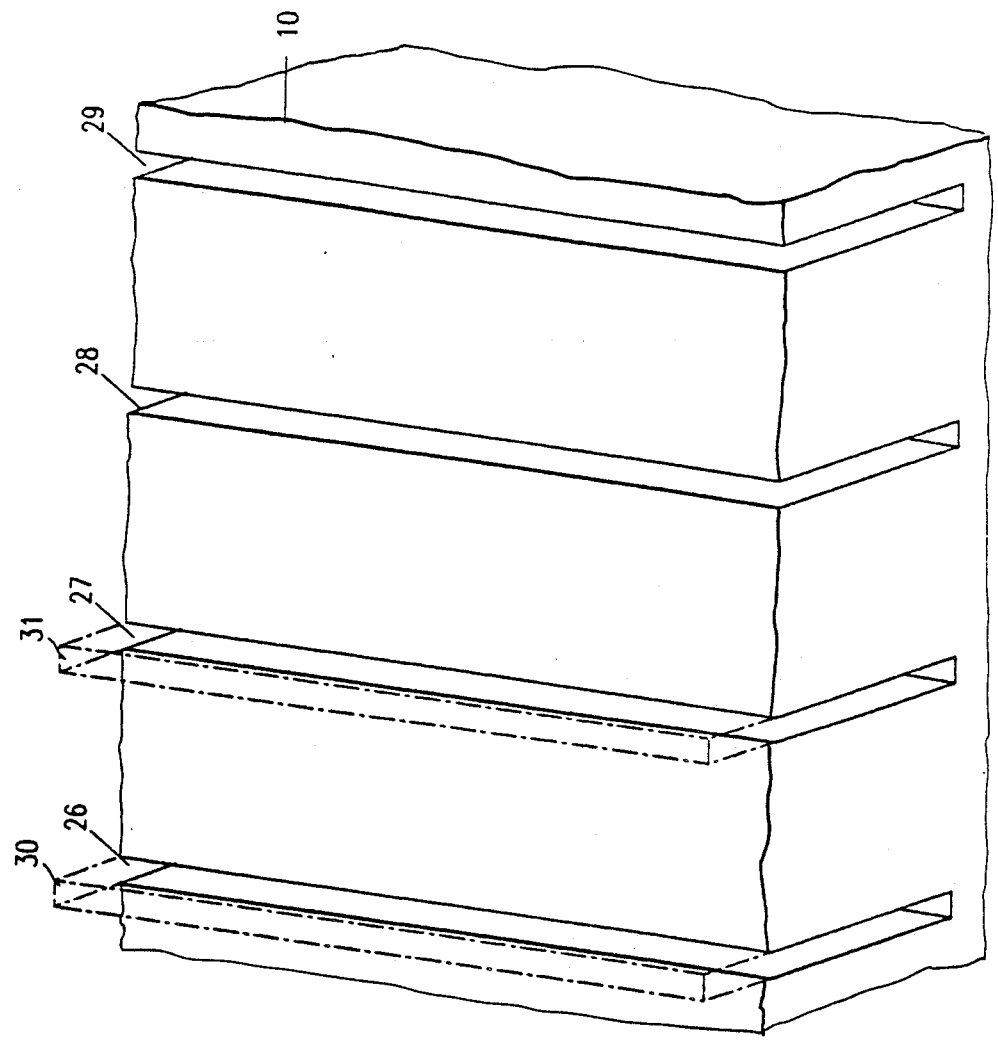
FIG. 2D is a perspective view which shows the substrate of FIG. 2C with phantom drawings of magnetic strips shown inserted into the slot.

FIG. 2D shows the substrate 10 of FIG. 2C after grooves 26 and 27 have been filled with magnetic strips 30 and 21 about 0.66 mm high and 0.1 mm thick.

Figure 2E:
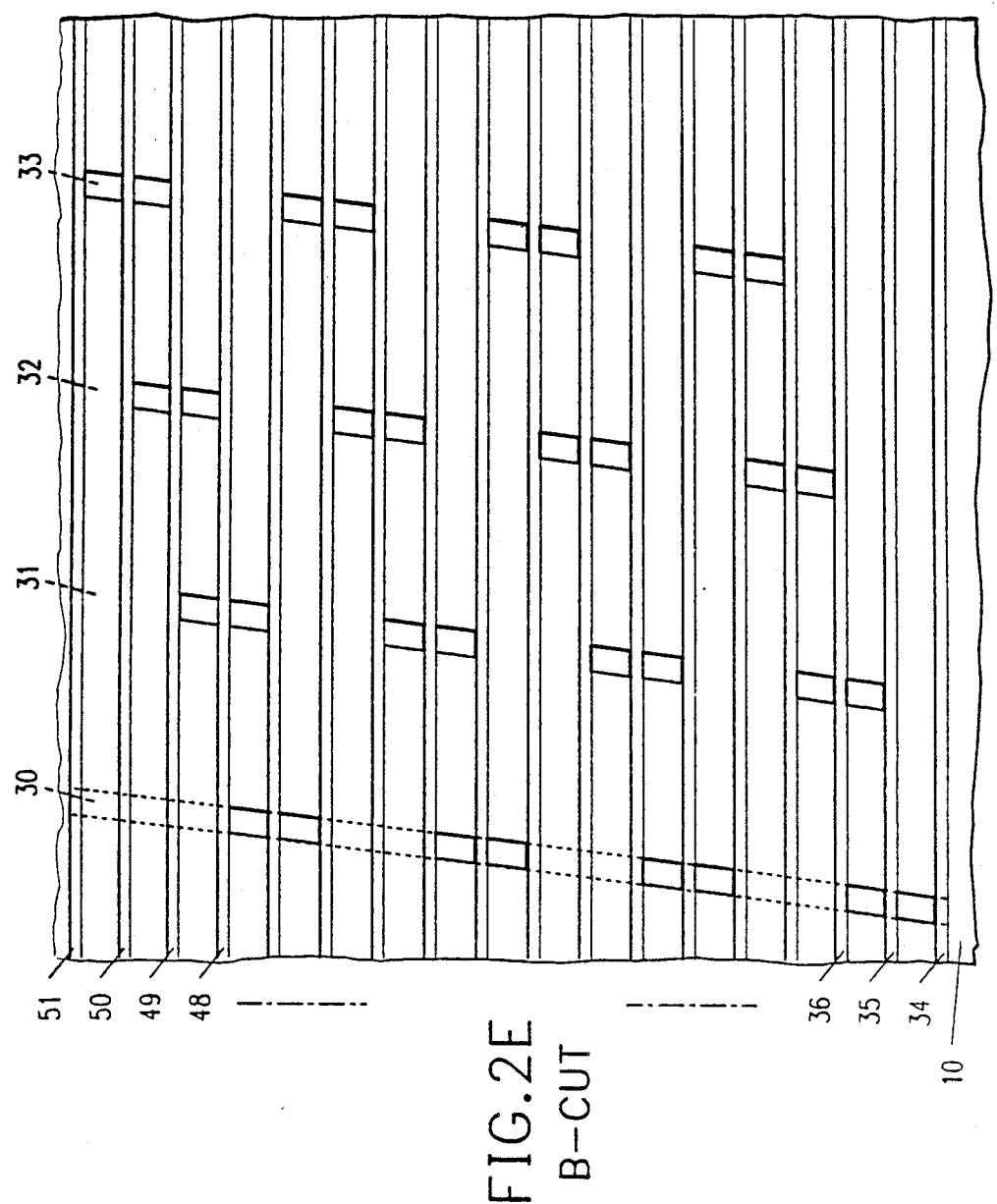
FIG. 2E is a plan view of the product of FIG. 2D after horizontal grooves have been cut, making the B-cut to form the slots forming magnetic gaps in the magnetic heads of the printers.

FIG. 2E shows the substrate 10 in a plan view with the magnetic strips 30, 31, 32, and 33 in slots 26, 27, 28 and 29 which are marked only by the dotted lines indicating strip 30 and by the posts 11 and 12 of each head 17 which is being formed by means of the transverse array of B cuts 35-51 which are about 0.15 mm deep to form the gaps 16 between the posts 11 and 12. At this point as indicated by the dotted line for strip 30, the remainder of the strips 30-33 are present with the exception of the slots 16 provided by the B-cut. The stagger angle of about 87° (relative to the horizontal axis) of the strip 30 can be seen on substrate 10.

Figure 2F:
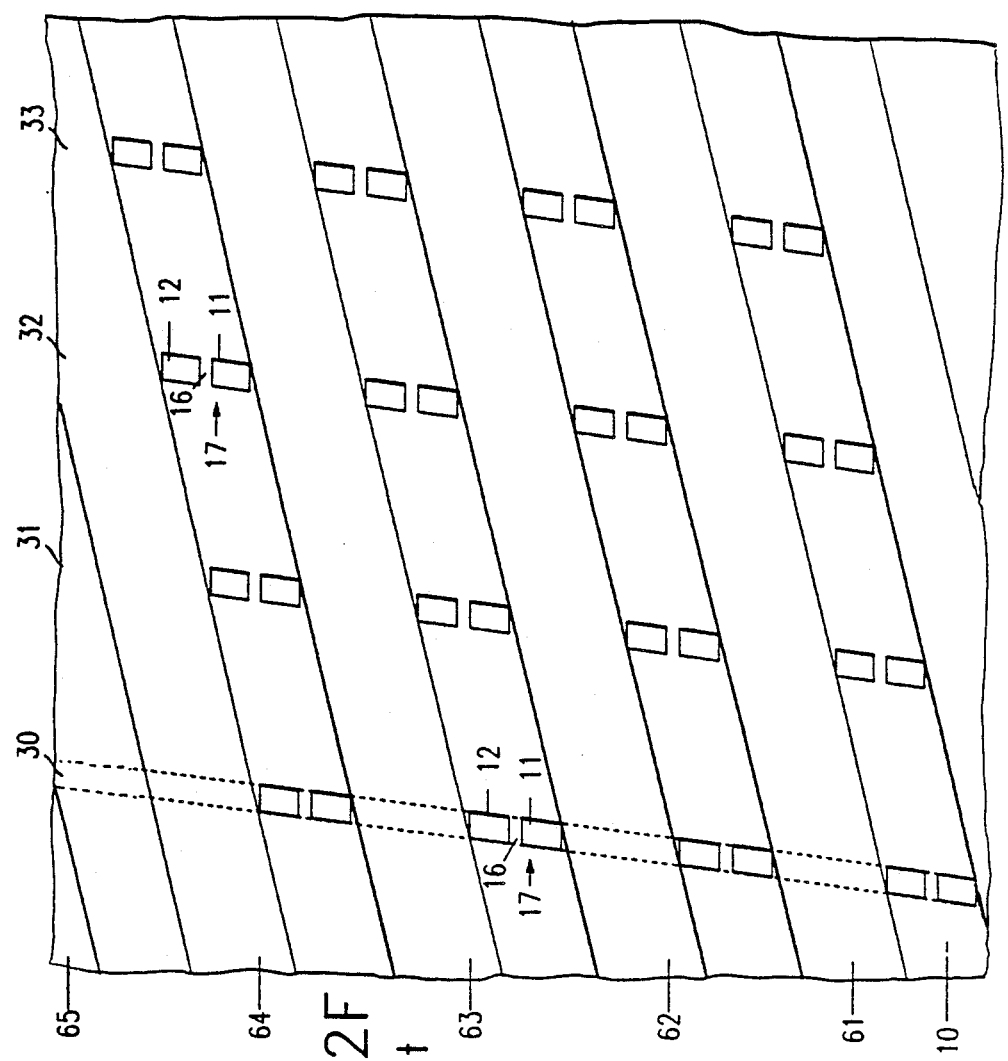
FIG. 2F is a plan view of the product of FIG. 2E with the cuts of FIG. 2E omitted for simplicity of explanation, and with the C-cuts between heads made at a diagonal angle with is the same as the angle of staggering of the columns of heads in FIG. 2A. This removes the portions of the strips of magnetic material remaining between the posts of the heads.

FIG. 2F shows the substrate 10 of FIG. 2E after the diagonal C-cuts 59, 60, 61, 62, 63, 64 and 65 have been made about 0.15 mm deep to form the shallow troughs 23 between adjacent heads 17 removing the upper portion of the strips 30-33 that are not posts 11 or 12. Note that the B cuts have been deleted from the drawing for convenience of illustration, but they would be visible as in FIG. 1E assuming that the cut is deep enough to cut into substrate 10. The magnetic strips under the C-cuts such as strip 30 are connected below the cuts.

In FIG. 2G, the D-cuts 70-74 are made about 0.66 mm deep, which is substantially deeper than the lower surface of the strips 30-33 so that the adjacent heads 17 are severed to reduce electrical and magnetic connections between adjacent heads 17. In this way short circuits and magnetic coupling are reduced.

FIG. 2H shows a sectional, elevational outline taken along line 2H-2H in FIG. 2G the result of the A, B, C and D cuts with the dimensions indicated in millimeters in order to illustrate the relationships shown in FIGS. 2A-2G.

Figure 2I:
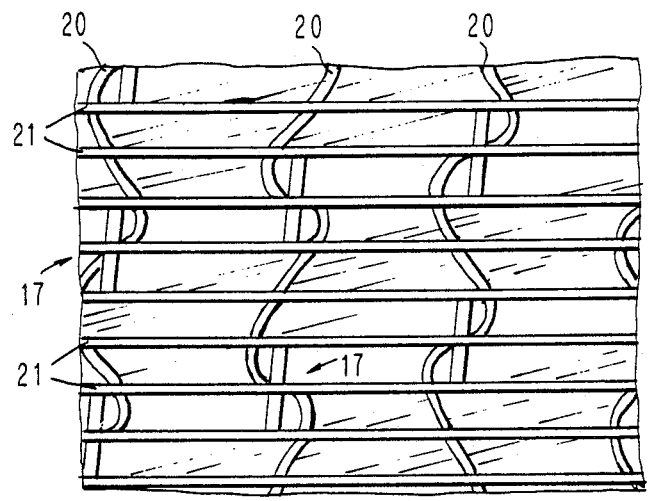
FIG. 2I is a perspective photograph from the general perspective of the plan view in FIG. 2A with the general wiring applied to the heads as indicated in FIG. 1A. The grooves can be seen at a diagonal across the substrate from the lower left extending upwardly to the right.
Figure 2J:
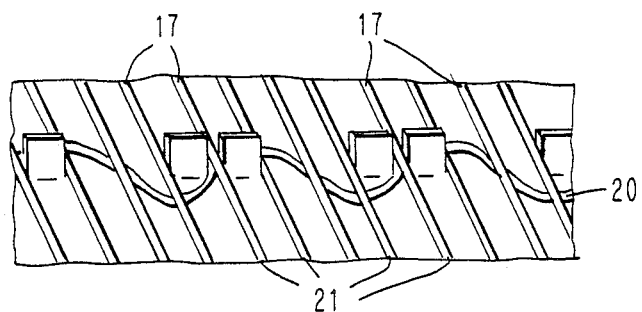
FIG. 2J is a photograph of the structure of FIG. 2I taken from the right end perspective relative to FIGS. 2A and 2B showing the wiring applied to the heads.

FIG. 2I shows a drawing made from a photograph of a plan view of an array of heads 17 in accordance with this invention with wires 20 and 21 respectively passing through the gaps in the heads. It can be seen that the heads are staggered. FIG. 2J is a perspective view from the right in FIG. 2I looking at two heads 17 in the center with the wires 21 extending from top to bottom in the drawing and a wire 20 passing in and out from left to right through the gaps 16 between the posts 11 and 12 of each of the heads 17.

Figure 2K:
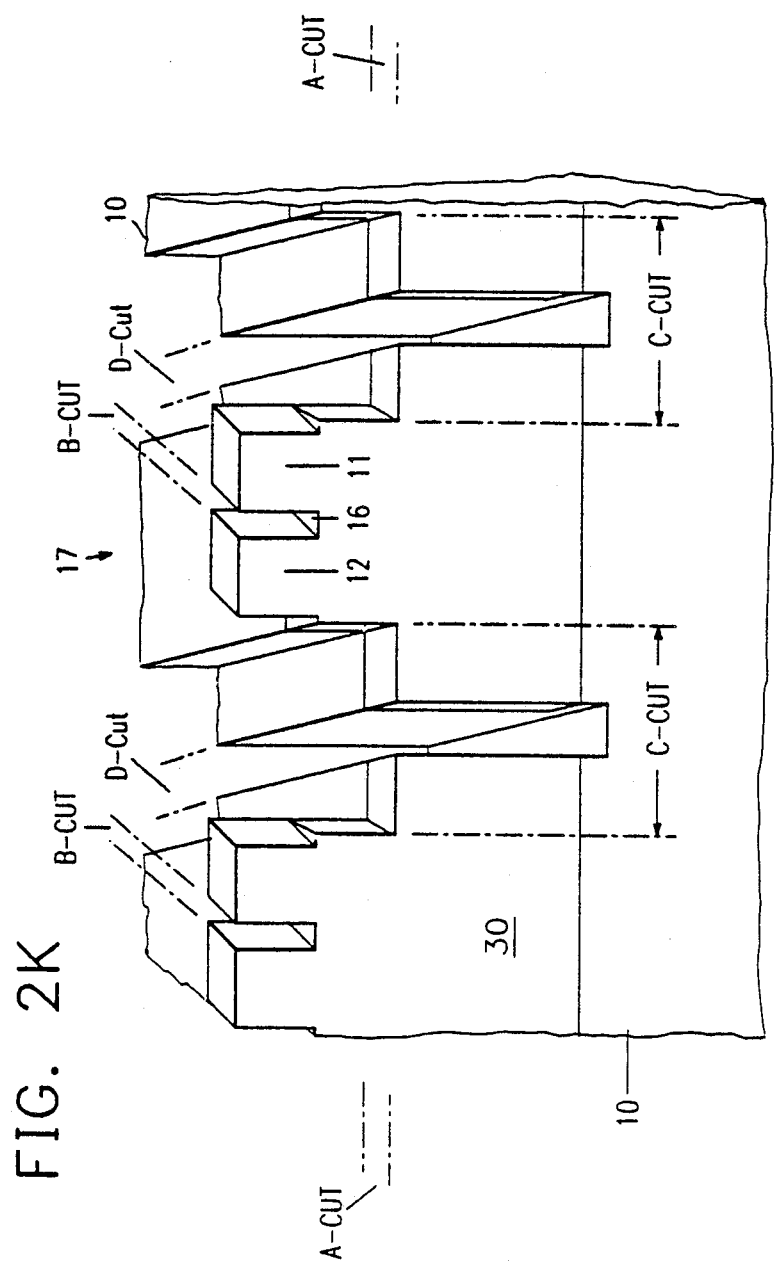
FIG. 2K is a perspective view similar to FIG. 2H and FIG. 2J which shows the relationship of the heads and the grooves produced by the cuts of FIGS. 2C-2G.

FIG. 2K shows a sectional view of a pair of heads 17 near the top in the foreground with legs 11 and 12 of each head 17 separated by a gap 16. The heads 17 are separated from each other in part by groove 23 which is relatively shallow and by deep groove 24 which is in the nature of a deep trough provided to assure magnetic isolation between adjacent heads 17.

FIGS. 3A and 3B show an extensive matrix of the kind shown in FIG. 2A with the x and y levels of wiring indicated by numbers 20 and 21 in FIG. 1A. The x and y levels of wiring are shown separately for clarity of description. In fact these levels are as shown in FIGS. 1C and 1D, i.e. superimposed on a single matrix of heads 17. One method of accomplishing this in practice is to form the wiring levels by means of etching or plating of the appropriate metal patterns on a supporting backing of a material such as Kapton polyimide. Holes formed in the backing material by means of a fabrication technique such as subtractive etching allow the wiring patterns to be deposited over the post array and glued into place.

It can be seen from FIGS. 3A and 3B that the patterns of wiring are quite simple. In particular, the x level of wiring in FIG. 3B consists of equally spaced straight wire lines 21. This means that no great accuracy is required over the long dimension of the array. Furthermore, the pattern of straight wires is one which is self-supporting by means of tension. Thus, the need for a backing material and even the need for lithography is eliminated. The y level of wiring for bit lines $B_1, B_2, \ldots B_N$ shown in FIG. 3A is modular. These patterns can be fabricated in short sections with increased yield.

Figure 3C:
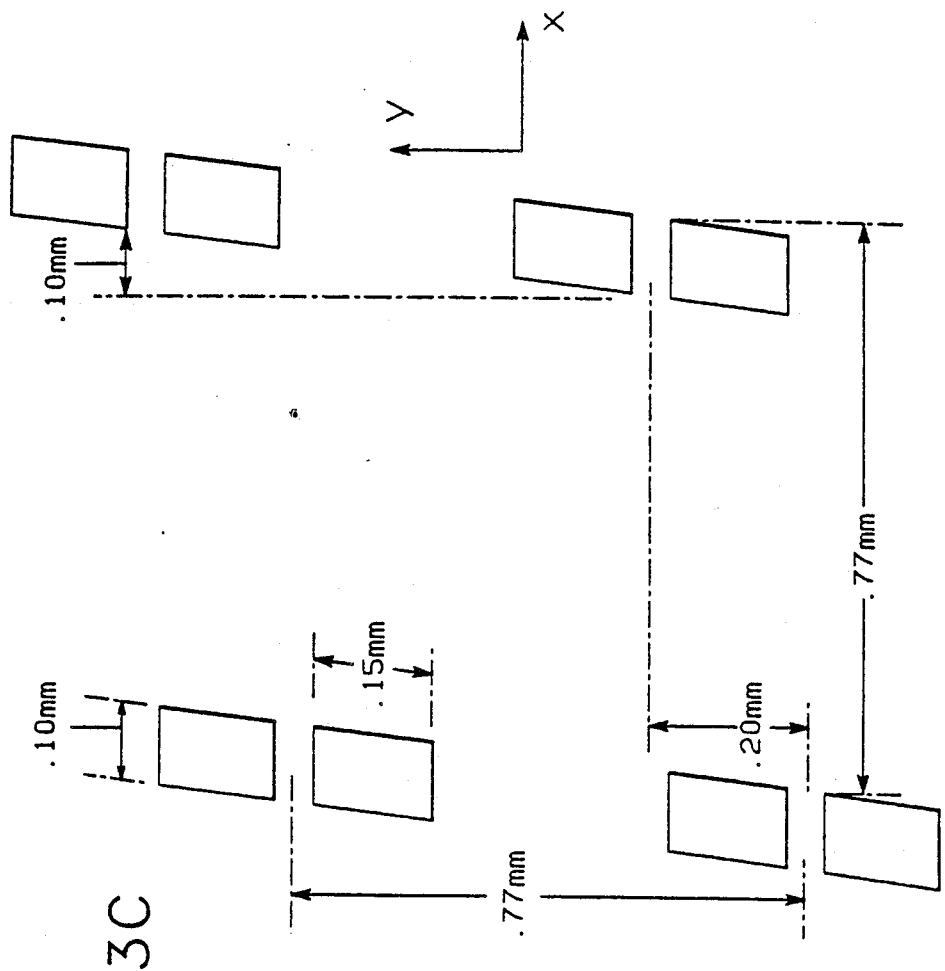
FIG. 3C shows a pattern of a detail of the unit cell of a staggered array of heads shown in FIGS. 2A, 3A, and 6.
Figure 6:
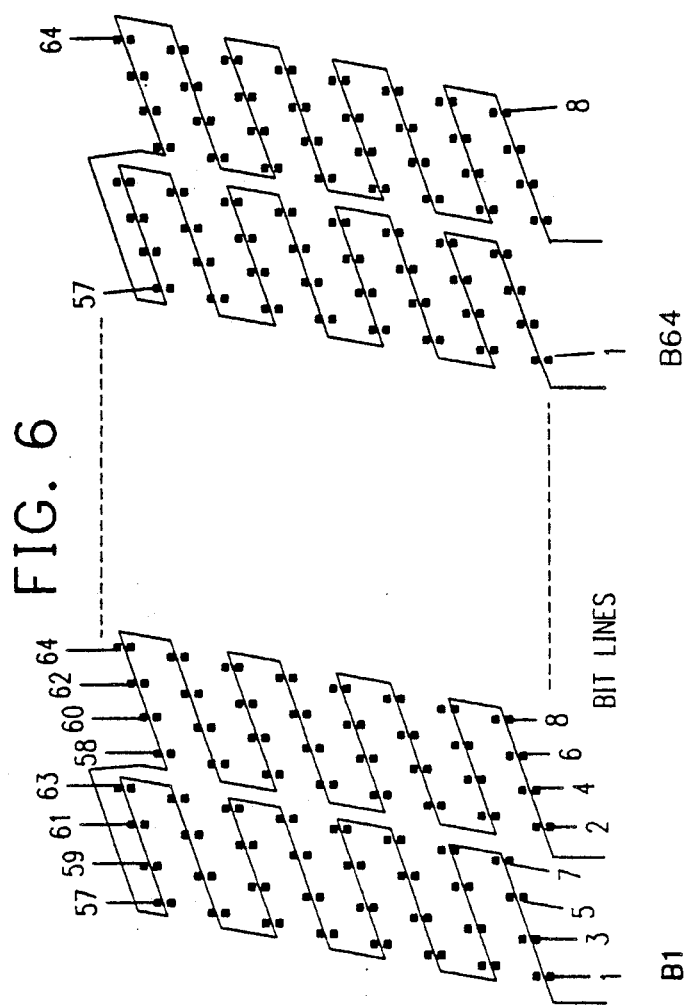
FIG. 6 is a bit line wiring diagram in accordance with FIG. 2A modified from FIG. 3A.

FIG. 3C shows the patterns and dimensional relationship detail drawing of four heads conprising a "unit cell" of a pair of parallel, staggered arrays of heads shown in FIGS. 2A, 3A and 6.

Since recording media 14 exhibit a fairly sharp threshold field for the establishment of remanence, coincident current selection of recording heads 17 can be used for magnetic printing. In this scheme (which has been applied to magnetic core memories, Josephson computer memories, and magnetic printing) the head array is wired in a 2-D matrix consisting of word lines along one dimension and bit lines along the other. Each recording head is energized by one word line 20 and one bit line 21 with each word/bit pair corresponding to a distinct head 17. Passage of current through both a word line and a bit line results in a field of two units at the head corresponding to that word/bit pair while all other heads produce zero or one unit. With a proper choice of current level the single unit of field will be insufficient for the establishment of remanence whereas two units will produce a strong recorded spot. Coincident current wiring is attractive because it enables an array of N heads to be selectively activated using only $2\sqrt{N}$ drive lines. Since only $\sqrt{N}$ heads can be independently activated at any one time, the array requires $\sqrt{N}$ separate operations for complete addressing.

As illustrated in FIGS. 3A and 3B this straightforward coincident current scheme can be applied to the type of longitudinal recording array discussed above. However, a substantial reduction in the number of required drive lines can be achieved by means of a modification of this basic method. Although this scheme is of general applicability, it is presented here in conjunction with longitudinal recording arrays because it allows for extremely simple and compact wiring patterns in embodiments of the array structures described above.

In its general form, this type of wiring builds upon the standard methods of wiring (two, three and higher dimensional matrix wiring) through the introduction of the concept of "clusters" of elements. Elements can be recording heads, magentic cores, quantized flux loops or other types of memory cells or transducers. A cluster is a group of elements which share all of the same wires but which are nonetheless individually addressable. Examples of two and three dimensional clusters are shown in FIGS. 4A and 4B. The elements are represented schematically as rods 41–45 about which the wires 46–50 are wrapped. For the two dimensional cluster of two elements 40, 41 the passage of currents of the same polarity results in a field of two units at the first element and zero at the second while passage of opposing currents results in zero at the first and two at the second. Wire 46 is wrapped in the same direction as wire 47 about element 40, but oppositely about element 41. In a similar manner, the passage of currents of the proper polarities in the three wires 48, 49 and 50 of the 3-D cluster allows any one of the four elements 42–45 to be activated with three units while the remaining elements produce a single unit.

It can be seen that the essential features of a cluster are that its elements can be "wrapped" in either of two directions and that the "output" of an element is given by the algebraic sum of its excitations. Thus, it may be possible to apply clustering to any physical system of transducers or memory elements which exhibits such features.

Conceptually, one method of implementation of this clustered element scheme involves starting with an array which has been wired by the standard coincident current method and replacing each element by a cluster of elements. In the case of 2-D matrix wiring this leads to a doubling of the number of addressable elements with no increase in the number of drive lines.

Figure 5B:
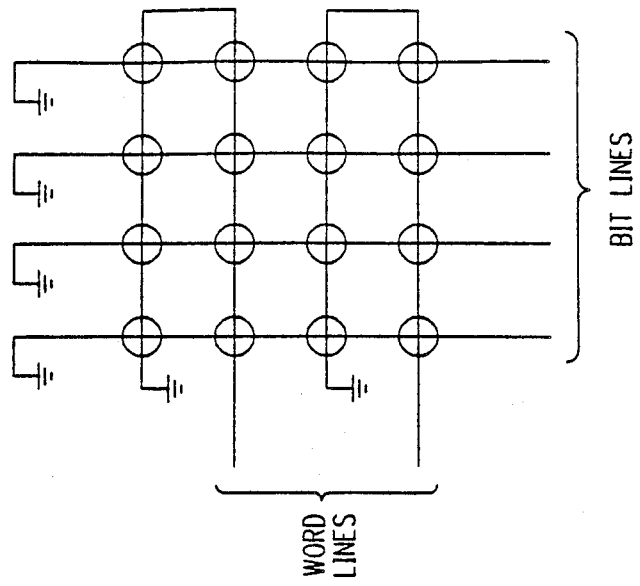
FIG. 5B is an arrangement in which pairs of word lines are connected in series to provide clustered wiring in accordance with this invention.
Figure 5A:
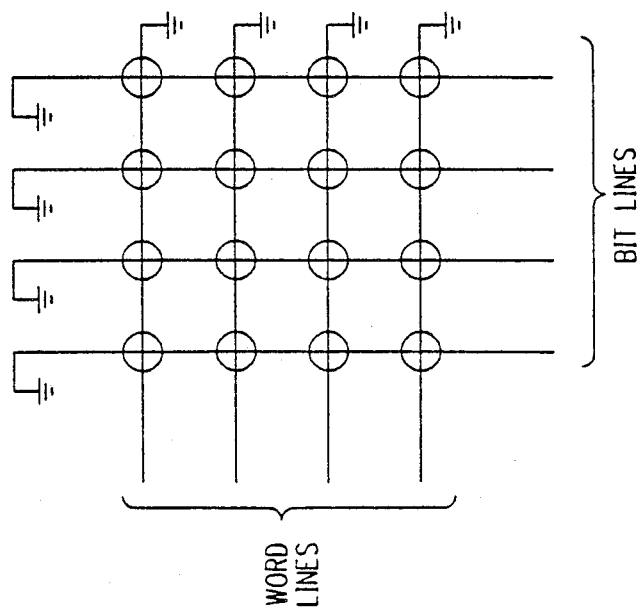
FIG. 5A is a wiring diagram of a two-dimensional arrangement in accordance with conventional two-dimensional matrix wiring.

Another implementation of clustering for 2-D wiring is illustrated in FIGS. 5A and 5B for an array of 16 elements. It can be seen that the conversion from standard wiring in FIG. 5A to clustered wiring as shown in FIG. 5B can be accomplished by connecting pairs of word lines in series, thereby resulting in a 25% reduction in the number of drive lines. Note that the number of bit lines is unchanged. This means that the number of write operations needed to address the entire array is also unchanged. Thus, the use of clustering allows N elements to be addressed with $1.5\sqrt{N}$ drive lines being pulsed in $\sqrt{N}$ separate operations. Referring to FIG. 3A, the dashed line 100 indicates that clustering can be provided by combining bit lines instead of word lines. Here the usual output line 101 of the first bit line group C1–C4 is connected to the output line 102 of group C5–C8. Thus the input line 104 now serves as the output line where line 103 is the input line.

The use of clustered wiring leads to a reduction in the number of drive lines needed for addressing an array of elements, but it can lead to added complexity in the drive circuits because it requires the use of bipolar drivers. However, in applications where the elements must be capable of bipolar output, one must use bipolar drive circuits in any event. Clearly, in such cases, the use of clustered wiring is advantageous.

Furthermore, in applications where the element outputs are monopolar, the penalty paid in driver complexity can be offset by the reduction in number of drive lines. Referring to FIGS. 5A and 5B, it can be seen that only the word lines need have bipolar drivers. It is these lines, however, which have been reduced in number by a factor of two, because the lines wrap back onto two successive rows in opposite directions.

An application of clustered 2-D wiring to the staggered post array discussed above is shown in FIG. 6. Again, the x and y levels of wiring are shown separately for clarity of description. Although the arrangement shown is for an array of 4096 recording heads (giving 256 dot/inch resolution on a 16 inch wide page), it can easily be adapted to arrays of other sizes.

The wiring patterns of FIG. 6 and FIG. 3B are best suited for bipolar operation of the recording array. In this mode successive word W and bit B lines are recorded with opposing polarities, thereby resulting in tri-state pattern of magnetization (positive, negative, and unmagnetized). This corresponds to the case of elements having bipolar outputs as discussed above and represents the most advantageous utilization of clustered wiring. The array of FIGS. 6 and 3B can also be operated in either of two types of monopolar recording mode. One type utilizes bipolar drive circuitry on the bit lines and monopolar drives on the word lines. Since the layout is such that there are twice as many bit lines B as word lines W this would involve more drive circuitry than is actually necessary. The other mode of operation involves driving the bit lines with monopolar current pulses and the word lines with bipolar. This results in recorded spots with alternating polarities across the page, but since a given head always writes with a fixed polarity it is still considered monopolar writing.

A bipolar mode of operation of the array shown in FIGS. 6 and 3B can be accomplished in a number of ways. In one method, the recording gaps are energized in the sequence indicated by the numbers next to the recording gaps in FIG. 6. It can be seen that complete addressing of the array of 4096 heads occurs after a sequence of 64 write operations. For the first operation line W1 is pulsed with a positive current and lines B1-B64 are selectively pulsed with an equal positive current or not pulsed at all depending upon whether the corresponding spots are to be recorded or not. For the second operation, line W1 is again (or still) positive and lines B1-B64 are selectively pulsed with negative current, thereby addressing the second members of the clusters associated with the first operation. In operations 3 and 4 the writing is occurring on a print line two spaces above that for operations 1 and 2, and is of the same polarity. Thus, line W2 is pulsed positively and lines B1-B64 are selectively pulsed first positively (for 3) and then negatively (for 4). The process is continued with lines W3-W32 being successively pulsed with positive current, each pulse lasting for two operations. After each sequence of eight operations the bit line pulses are inverted in order to account for the reversals in the direction of passage of these lines through the recording gaps.

The velocity of the medium is set so that in the time taken to complete the 64 operations it has moved a distance equal to one recorded spot size in the y direction. In this way, when the process begins again with operation 1, the recording gaps (1's) will be positioned to write the next line down on the medium. Since the magnetization is to be reversed on successive lines, this second set of 64 operations is carried out with all currents reversed. This overall procedure is repeated until the entire page has been recorded.

Current waveforms for the above description of the recording process are shown in FIG. 7. The pulses for the bit lines are shown dashed to indicate that these pulses are present only for those bits which correspond to dark areas of the document. Note that there is a major difference in duty cycle between word line signals and bit line signals. The duty cycle of a word line signal is at most equal to 1/32 because a given line is only on for 2 out of the 64 operations. The duty cycle for a bit line depends upon the amount of dark area in the document, and unless the pulses are very short, a very dark document can result in a duty cycle approaching unity. Since currents of the order of several amps will be required, it is important that the bit lines have low inductance in order to facilitate the production of short pulses and have low resistance so as to reduce Joule losses in the wires. Thus, an attractive feature of the layout of FIGS. 6 and 3B is that the bit lines are kept physically short. In addition the wires can be expanded in width in the large spaces between heads in order to further reduce their resistance and stray inductance.

Referring again to FIG. 6, note that for the above mode of operation the y displacement between heads 1 and 3 (also 2 and 4, 3 and 5, etc.) is made equal to twice the recorded spot size plus 1/32 of a spot in order to adjust for the continuous motion of the medium during recording. It may also be desirable to shift the set of even numbered gaps upward by 1/64 of a spot size with respect to the odd numbered gaps, but this very small misalignment may not be serious enough to warrant correction.

The fabrication of arrays of the type discussed here can be accomplished by means such as machining of a substrate or by a series of plating steps in which the posts and the wiring layers are deposited upon a substrate. In the case of machined post structures, the wiring layers would be added after machining, either by plating onto the structure or by placement of pre-fabricated conductor patterns over the array. In this regard, it should be noted that the bit lines of FIG. 6 are each localized in a small region of the array and can therefore be fabricated as separate units containing ine or a few bit lines. Fabrication tolerances are therefore less stringent than for the case in which a unit must fit over the entire width of the array. Although the word lines do extend the full width, the pattern for these is extremely simple (straight wires) and involves tight tolerances over only a single dimension (y) of short extent.

The arrays described above have been illiustrated as planar structures. It is possible, however, to fabricate such structures on a curved surface so as to facilitate conformance to a flexible recording medium.

We claim:

1. In an arrangement of a plurality of magnetic heads formed in a staggered array,
including an x axis directed transversely,
a y axis directed vertically,
said heads including gaps therein,
said heads being formed in a plurality of groups of parallel columns with said gaps in said heads in adjacent columns being aligned in a periodically staggered arrangement with a word line being coupled to all heads along a transverse line basis, a pair of heads being coupled to each word line in a given one of said groups, and all of the heads in a said group being coupled to a single bit line with the sense of current for a first one of said pair of heads in a said group being reversed in said bit line for the other said head in said group coupled to said same word line.

2. A structure carrying a plurality of magnetic recording heads in a staggered array arrangement for recording at least one line of data on a data recording medium, wherein said array is formed of a plurality of parallel columns of heads staggered relative to the line of data being recorded, an x axis extending parallel to said line being recorded, a y axis extending vertically with respect to said line being recorded, said columns being arranged at a small acute angle with respect to said y axis, a substrate, said heads in a given column being formed into a strip of magnetic material deposited into each corresponding diagonal parallel slot in a said substrate, with said plurality of columns being formed of a plurality of strips inserted into a plurality of slots in said substrate, said slots being parallel to said slot, with horizontally oriented cuts substantially parallel to said x axis through said strips cut in parallel across said strip to form slots for magnetic recording gaps, a plurality of cuts between said heads being cut at a small acute angle with respect to said x axis extending down into the substrate thereby removing superfluous magnetic material from said strips to define separate magnetic heads from said strips.

3. In an arrangement of a plurality of bistable devices, said arrangement including at least two actuation lines for carrying electrical currents and for coupling electrical voltages to said devices comprising bit and word lines for actuating selected ones of said devices, said two actuation lines being coupled to said selected ones of said devices, all of said devices in said selected ones of said devices being grouped into clusters and actuating said devices with currents on a common set of lines by selectively reversing the sense of actuation current from a relatively positive or negative to negative or positive respectively in one or both of said word and bit lines connected to devices in said cluster.

4. An array of magnetic heads, an x axis and a y axis in a rectilinear coordinate system, said heads being arranged in a staggered set of arrays adapted to produce data which is transferred by a scanning surface interacting with the heads to produce a straight line of data, said line of data being parallel to said x axis, with parallel staggered columns of heads forming a subset of heads, with staggering of the columns of heads at a small acute angle with respect to said y axis in order to maximize the separation distance between said magnetic heads to minimize the interaction between said heads.

5. A set of magnetic elements activated by a modified half-select technique wherein said elements are divided into clusters, said clusters comprising a plurality of said elements sharing identical wires, with said wires shared by said elements being applied to said elements with differing polarity permutations for each element, whereby each element is supplied a unique set of input signals so that any one of said plurality of elements in a cluster can be activated by signals of the proper polarity in the proper combination while all of the remaining elements in said cluster will not be activated for the said proper combination for the said one of said plurality of elements.

6. In an arrangement of magnetic recording heads for recording a magnetic line of data on a data recording medium, said heads being in juxtaposition with said medium, a horizontal x axis extending parallel to said line of data and said medium, a vertical y axis extending parallel to said medium and at a right angle with respect to said x axis and said line of data, said heads being arranged in a plurality of parallel and generally vertically extending columns, whereby said heads can be actuated with staggered actuation times to record data on a single line parallel to said x axis on a medium moving along said y axis, a plurality of said staggered columns of heads forming an array, said heads in adjacent columns in an array extending in generally horizontally extending rows, all of said columns of heads in said array being staggered at the same small acute angle with respect to the vertical y axis in order to provide greater separation between said heads for a for a given data density along a said line of data, all of said rows of heads in said adjacent columns being staggered at a small acute angle with respect to the horizontal x axis in order to provide greater separation between said heads for a given data density along said line of data which extends in the horizontal direction parallel with said x axis.

7. In an arrangement of magnetic recording heads for recording a magnetic line of data, said heads being arranged in columns of heads, said columns of heads being tilted by a small acute angle with respect to a line perpendicular to said line of data to be printed, said tilt being provided in order to increase the separation between said heads for a given data density along said line, wherein, for a group of said heads, a single energizing line comprising a bit line is coupled to each of said heads, and each of a plurality of word lines being connected to a plurality of heads comprising a subgroup of said heads in said group, with a reversal in the sense of the windings of said bit lines relative to said word lines.

8. An arrangement in accordance with claim 7 wherein the lowest heads in each of said arrays and the highest heads in each of said arrays define the upper and lower ends of said parallelogram extending at a small acute angle above said printing line.

9. An arrangement in accordance with claim 7 wherein said word lines are parallel straight lines extending directly through the gaps of said heads to which said word lines are coupled.

10. An arrangement in accordance with claims 7 wherein said word lines are parallel straight lines extending directly through the gaps in said heads to which said word lines are coupled with a plurality of groups of arrays of heads being coupled to each of said word lines in like manner.

11. In an arrangement of magnetic recording heads for recording a magnetic line of data, said heads being arranged in parallel columns, said parallel columns extending generally perpendicularly to said line of data in order to provide greater separation between said heads for a given data density along said line, said columns of heads being aligned at a small acute angle with respect to a line perpendicular to said line of data to be printed, said parallel columns of heads forming arrays comprising groups of said columns of heads arranged in repetitive sets of parallel columns at a predetermined periodicity, said parallel arrays having a row of heads nearest to said line of data to be printed being staggered at a small acute angle from being parallel to said line of data to be printed, wherein, for a group of said heads, a single energizing line comprising a bit line is coupled to each of said heads in said group, and each of a plurality of word lines is connected to a subgroup of a plurality of said heads in said group, with a reversal in the sense of the windings of said bit lines relative to word said lines.

wherein a pair of heads is connected to a set of said word and bit lines with the sense of the magnetic fields of said set of word and bit lines being relatively reversed through said pair of heads whereby operation of said bit line and said word line will depend upon the sense of current polarity in said lines.

12. An arrangement in accordance with claim 11 wherein said heads in a said group of said heads are arranged with parallel arrays of heads contained within a shape in the form of a parallelogram tilted at a small acute angle with respect to the line of data to be printed on said medium, with heads physically adjacent to each other in a column printing adjacent points on said line.

13. A set of magnetic elements activated by a modified half-select technique wherein said elements are divided into clusters, said clusters comprising a plurality of said elements sharing identical wires connected to means supplying signals of more than one polarity, wires shared by said elements being applied to said elements with a plurality of polarity permutations being required to activate all said elements with each element responding to only one of said permutations uniquely, whereby each element is supplied with a unique set of input signals so that any one of said plurality of elements in a cluster can be activated by signals of the proper polarity in the proper combination, while all of the remaining elements in said cluster will not be activated for the said proper combination for the said one of said plurality of elements.

* * * * *